United States Patent
Kuenzi et al.

(10) Patent No.: US 11,405,748 B2
(45) Date of Patent: Aug. 2, 2022

(54) ACCESS CONTROL SYSTEM WITH MESSAGING

(71) Applicant: Carrier Corporation, Palm Beach Gardens, FL (US)

(72) Inventors: Adam Kuenzi, Silverton, OR (US); Bonnie McClure, Salem, OR (US); Steve Switzer, Atlanta, GA (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/473,027

(22) PCT Filed: Dec. 12, 2017

(86) PCT No.: PCT/US2017/065686
§ 371 (c)(1),
(2) Date: Jun. 24, 2019

(87) PCT Pub. No.: WO2018/128755
PCT Pub. Date: Jul. 12, 2018

(65) Prior Publication Data
US 2020/0092676 A1    Mar. 19, 2020

Related U.S. Application Data

(60) Provisional application No. 62/444,034, filed on Jan. 9, 2017.

(51) Int. Cl.
*H04W 4/02* (2018.01)
*G07C 9/23* (2020.01)
(Continued)

(52) U.S. Cl.
CPC ............ *H04W 4/023* (2013.01); *G06F 21/34* (2013.01); *G07C 9/23* (2020.01); *H04M 1/7243* (2021.01); *H04M 1/72421* (2021.01)

(58) Field of Classification Search
CPC . G06F 21/34; G07C 2209/08; G07C 2209/63; G07C 2209/64; G07C 9/00571;
(Continued)

(56) References Cited

U.S. PATENT DOCUMENTS

| 7,920,851 B2 | 4/2011 | Moshir et al. |
| 8,844,811 B1 | 9/2014 | Rogers et al. |

(Continued)

FOREIGN PATENT DOCUMENTS

| CN | 103177495 A | 6/2013 |
| CN | 103208142 A | 7/2013 |

(Continued)

OTHER PUBLICATIONS http://www.sun-sentinel.com/business/tourism/fl-keyless-hotels-20150327-story.html.
(Continued)

*Primary Examiner* — Omeed Alizada
(74) *Attorney, Agent, or Firm* — Bachman & LaPointe, P.C.

(57) ABSTRACT

A method of messaging includes communicating a message to an application on a mobile device via an access control credential system and displaying the message on the mobile device.

21 Claims, 7 Drawing Sheets

(51) Int. Cl.
*G06F 21/34* (2013.01)
*H04M 1/7243* (2021.01)
*H04M 1/72421* (2021.01)

(58) Field of Classification Search
CPC . G07C 9/00904; G07C 9/23; H04M 1/72538; H04M 1/72547; H04W 4/023
See application file for complete search history.

(56) References Cited

U.S. PATENT DOCUMENTS

| | | | |
|---|---|---|---|
| 9,087,246 | B1 | 7/2015 | Chin et al. |
| 9,367,975 | B2 | 6/2016 | Robertson et al. |
| 9,406,180 | B2 | 8/2016 | Eberwine et al. |
| 9,437,063 | B2 | 9/2016 | Schoenfelder et al. |
| 9,466,160 | B2 | 10/2016 | Lee et al. |
| 10,062,226 | B2 | 8/2018 | Kuenzi et al. |
| 2003/0066883 | A1 | 4/2003 | Yu |
| 2007/0130692 | A1* | 6/2007 | Lemire ............... A61G 7/0506 5/618 |
| 2012/0011033 | A1* | 1/2012 | Salgia .................. G06Q 50/12 705/27.2 |
| 2012/0068818 | A1* | 3/2012 | Mizon ..................... G07C 9/20 340/5.61 |
| 2012/0169461 | A1 | 7/2012 | Dubois, Jr. |
| 2012/0280789 | A1* | 11/2012 | Gerhardt ............ H04L 63/0428 340/5.61 |
| 2014/0051407 | A1 | 2/2014 | Ahearn et al. |
| 2015/0170448 | A1* | 6/2015 | Robfogel ........... G07C 9/00904 340/5.61 |
| 2015/0186803 | A1 | 7/2015 | Stong |
| 2015/0199863 | A1 | 7/2015 | Scoggins et al. |
| 2015/0279130 | A1* | 10/2015 | Robertson ................ G07C 9/20 340/5.61 |
| 2016/0044472 | A1 | 2/2016 | Person |
| 2016/0227408 | A1 | 8/2016 | Sherin |
| 2016/0300411 | A1 | 10/2016 | Isaacson |
| 2017/0311161 | A1 | 10/2017 | Kuenzi |

FOREIGN PATENT DOCUMENTS

| | | |
|---|---|---|
| CN | 104063817 A | 9/2014 |
| CN | 104156771 A | 11/2014 |
| CN | 104599354 A | 5/2015 |
| CN | 104809793 A | 7/2015 |
| CN | 204926251 U | 12/2015 |
| CN | 105788050 A | 7/2016 |
| WO | 2014007870 A1 | 1/2014 |
| WO | 2015074298 A1 | 5/2015 |
| WO | 2016089841 A1 | 6/2016 |
| WO | 2016089846 A1 | 6/2016 |

OTHER PUBLICATIONS http://blog.beaconstac.com/2014/07/how-hotels-can-use-beacons-to-enhance-guest-experiences/.
International Search Report dated Mar. 21, 2018 for PCT/2017/065686.
EP Office action dated Mar. 10, 2021 issued for corresponding European Patent Application No. 17825336.5.
Chinese Office Action dated Jul. 29, 2021 issued for related Chinese Patent Application No. 201780082855.5.

* cited by examiner

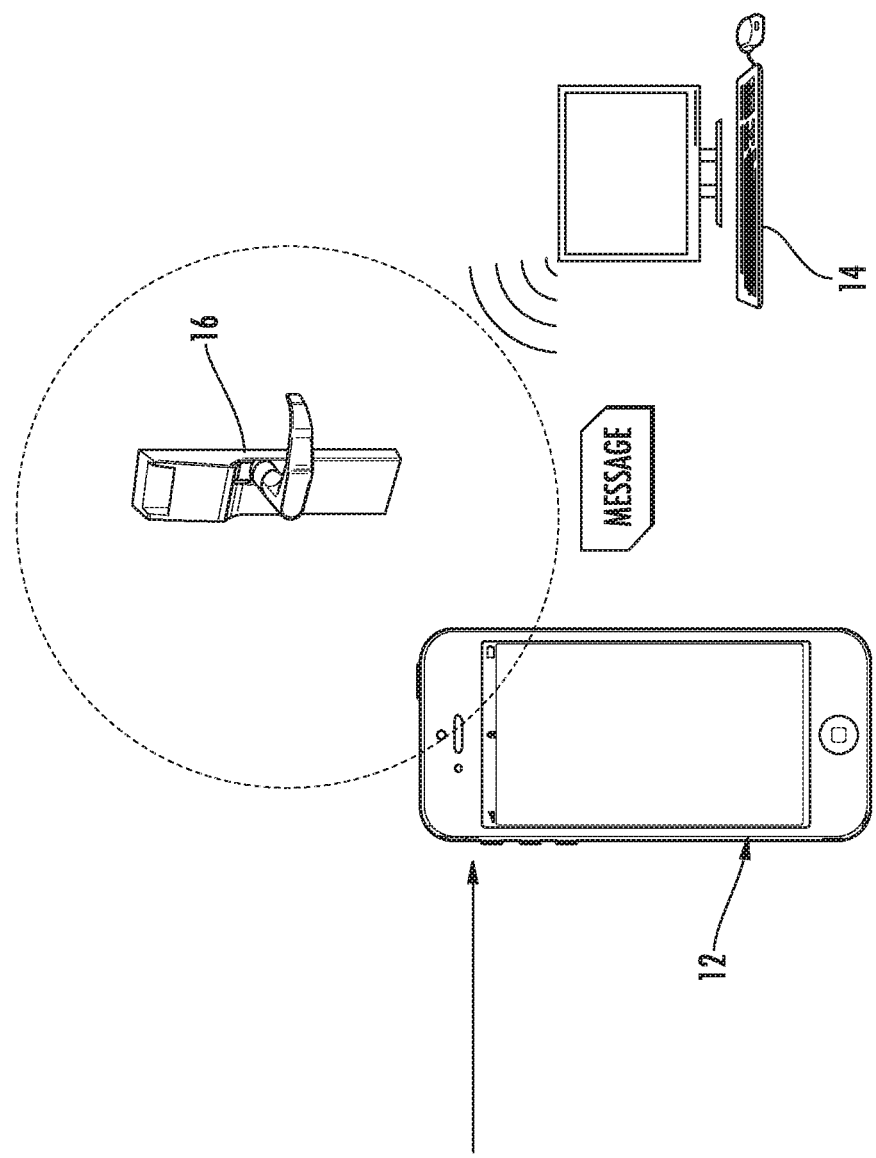

ACCESS CONTROL SYSTEM WITH MESSAGING

BACKGROUND

The present disclosure relates generally to access control systems, and more particularly, to a system and method that provides for messaging.

A credential service, which can issue mobile credentials (secure, encrypted, verifiable data that encodes access rights) to a mobile device for opening an electronic lock, is usually hosted in a cloud or off-premise location. Sometimes a front desk, or reservation system, or local portal can issue mobile credentials to a mobile device. Credentials are issued after identifying the guest with their account. Usually guests create and manage an account associated to the credential service through a hotel loyalty program.

Typical hotel loyalty programs require a hotel guest to create and manage an account or associate to a cloud hosted service so they can access hotel property services, for example, make a reservation. Large hotel chains utilize these loyalty accounts to also send messages. Small independent properties typically do not have large corporate entities that can support their operations with special loyalty applications and services for messaging guests, supporting groups of guests and coordinating other such complicated functions. Generally independent properties only run an access control system for guests.

SUMMARY

A method of messaging according to one disclosed non-limiting embodiment of the present disclosure can include communicating a message to an application on a mobile device via an access control credential system; and displaying the message on the mobile device.

A further embodiment of the present disclosure may include displaying the message on the mobile device in response to a location of the mobile device.

A further embodiment of the present disclosure may include displaying the message on the mobile device in response to a time.

The method as recited in claim 1, further comprising communicating the message to a multiple of mobile devices.

A further embodiment of the present disclosure may include communicating the message as a check-in reminder.

A further embodiment of the present disclosure may include communicating the message as a check-out reminder.

A further embodiment of the present disclosure may include communicating the message as emergency instructions.

A further embodiment of the present disclosure may include communicating the message in response to a proximity between the mobile device and an access control.

A further embodiment of the present disclosure may include communicating the message in response to an event and the proximity between the mobile device and the access control.

A further embodiment of the present disclosure may include that the proximity includes leaving a designated area.

A further embodiment of the present disclosure may include that the proximity includes passage through a doorway.

A further embodiment of the present disclosure may include that the doorway includes a door with the access control.

A further embodiment of the present disclosure may include communicating a message from the mobile device back to a local portal.

A further embodiment of the present disclosure may include entering the message to a local portal.

A further embodiment of the present disclosure may include that the local portal is a mobile device used by a hotel staff.

A further embodiment of the present disclosure may include that the hotel staff uses the mobile device.

A further embodiment of the present disclosure may include generating a credential in a credential service for the access control credential system.

A further embodiment of the present disclosure may include downloading the credential from the credential service to the mobile device.

A system according to another disclosed non-limiting embodiment of the present disclosure can include a local portal; and an application on a mobile device operable to communicate a message between the local portal and the application.

A further embodiment of the present disclosure may include that the application on the mobile device is operable to communicate with the local portal via an access control credential system.

A further embodiment of the present disclosure may include that the application on the mobile device is operable to communicate with the local portal via at least one of Bluetooth, and Internet.

A further embodiment of the present disclosure may include an access control, the message communicated to the application in response to a proximity of the mobile device to the access control.

A further embodiment of the present disclosure may include an access control, the message displayed by the application in response to proximity of the mobile device to the access control.

A further embodiment of the present disclosure may include that the local portal is a front desk portal.

A further embodiment of the present disclosure may include that the application is tailored for use by hotel staff.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 8 is a schematic view of a messaging method triggered by proximity to an access control according to one embodiment.

DETAILED DESCRIPTION

Figure 1:
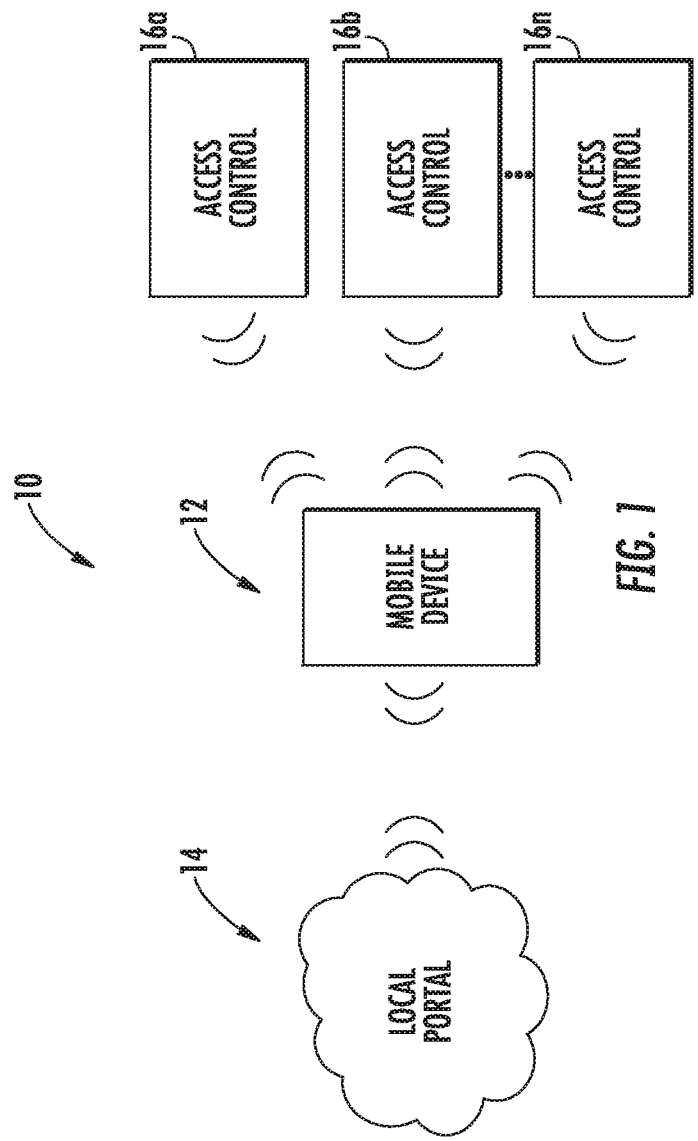
FIG. 1 is a general schematic system diagram of a user authentication system.

FIG. 1 schematically illustrates a user authentication system 10. The system 10 generally includes a mobile device 12, a local portal 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone device that is operable to communicate with the local portal 14 and the access controls 16 via an application "app" that runs on the smartphone device (also referred to herein as the mobile device 12). The local portal 14 may provide mobile credentials and other data to the mobile device 12, such as firmware or software updates, to be communicated to one or more of the access controls 16. Although the local portal 14 is depicted herein as a single device (for example a computer, a tablet, a phone, or in general a single computing device with inputs and outputs for use by a person to use, generate mobile keys 200, and so forth as described herein), it should be appreciated that the local portal 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, vehicle ignition system, vehicle door lock or compartment lock, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. In yet another example, the user may submit the credential to a unit that enables access to a computer system. The mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
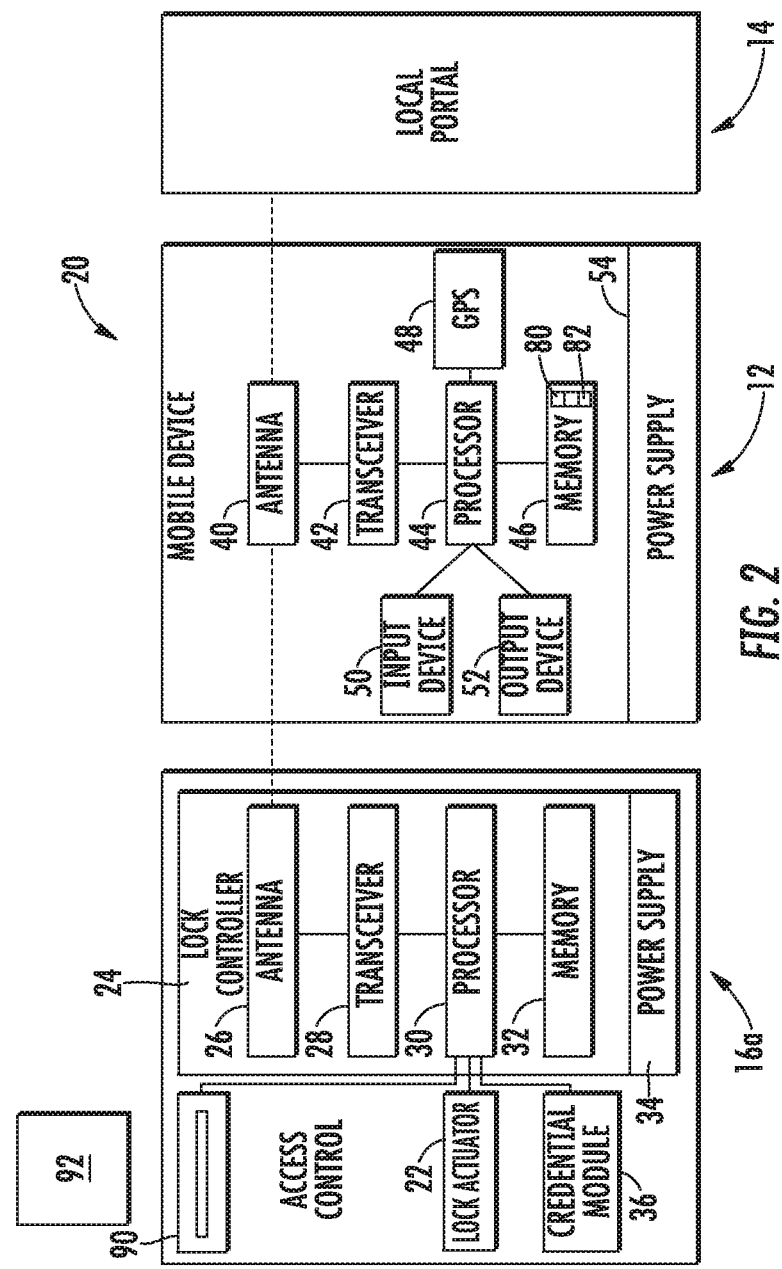
FIG. 2 is a block diagram of an electronic lock system.

With reference to FIG. 2, a block diagram of an example electronic lock system 20 includes the access control 16a, the mobile device 12, and the local portal 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, data access systems and computer access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the local portal 14. In other embodiments, one or more separate transceivers and antennas may be included to communicate with local portal 14. The key memory 46 is of a type to store a plurality of credentials locally on the mobile device 12.

Figure 3:
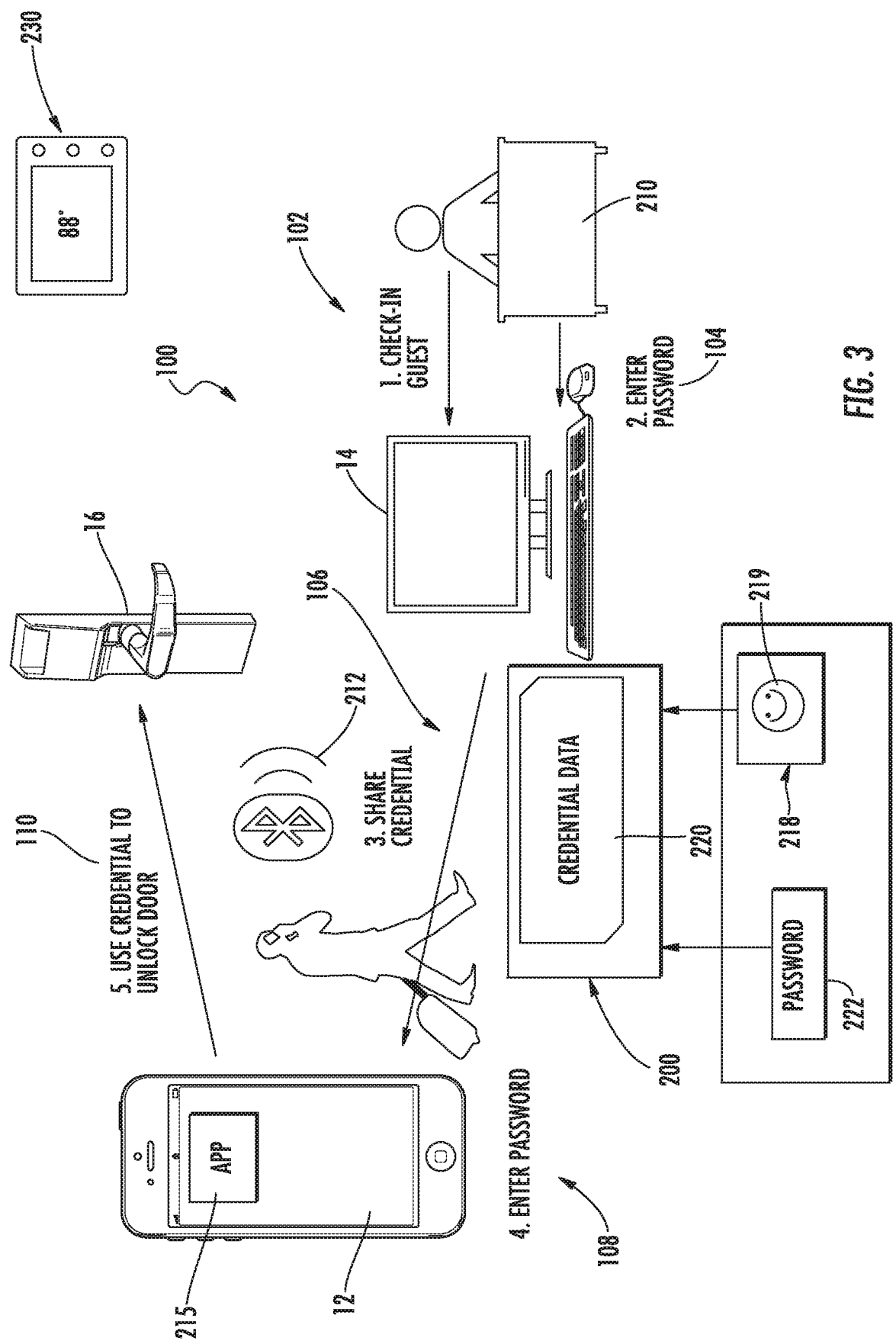
FIG. 3 is a flowchart for local communication of a credential method according to one embodiment.

With reference to FIG. 3, a method 100 is disclosed in terms of functional block diagrams. It should be appreciated that these functions may be enacted in either dedicated hardware circuitry or programmed software routines capable of execution in various microprocessor based electronics control embodiments.

The method 100 does not require the local portal 14 to identify the guest but does distribute a mobile key 200 to a mobile device 12 in a local manner such as at a property front desk 210 without requiring complex interactions to manage guest accounts. The method 100 permits the local portal 14 to 'encode' the mobile key 200 and deliver the mobile key 200 securely to the mobile device 12 by, for example, Bluetooth 212 directly to their application 215; by email to an email address accessible to the mobile device 12 such that the pertinent mobile key data 200 can be transferred by copy from the email and paste into the application 215; and/or sent by SMS text messages to the mobile device 12 and again copied from the text message and pasted into application 215. In the case of email or SMS, mobile key data 200 may also be transferred into the application 215 utilizing a specialized link that when 'clicked' or is accessed, the mobile device launches application 215 and transfers data 200 into the application. Alternatively, data 200 can be rendered into an image 219 such as QR Code, image, picture, etc. and the application 215 can utilize the mobile device 12 to scan the image 219 that is presented in, for example, a kiosk or screen or display 218 near the front desk 210 and part of or included with the local portal 14. The application 215 can then processes the image 219 to obtain mobile key data 200.

To securely transfer mobile credential data 220, the data 220 is encrypted (e.g., like an encrypted ZIP file or other encrypted file format) with the pre-shared password 222 such as a driver's license number, property confirmation number, image, credit card number (e.g that was used to pay for the hotel stay), phone number, email address, other piece of pre-shared data or a combination of any of these. Ideally the password 222 is determined based on information shared with the property before the guest's arrival so that the password is not shared when the guest is present at the front desk 210 and when the mobile key 200 is sent from the local portal 14 to the mobile device 12. This encrypted mobile credential data 220 is also called a mobile key 200. By entering the pre-shared password 222 into the application 215, the credential data 220 can be decrypted from mobile key data 200 and can then be utilized.

Initially, guest check-in (step 102) permits a property manager (i.e. Hotel front desk agent), via standard property tools/methods including centralized reservation systems, property management systems, etc., to check in the guest. That is, the property staff will validate the guest's real identity using standard methods such as manual review of a driver's license or other identification.

Once the guest is checked in, the pre-shared password 222 is selected from available information and entered (step 104) into the local portal 14. That is, in addition to selecting the guest room and/or indicating standard additional authorizations to include, but not be limited to, parking, pool, etc., the property staff may set the pre-shared password 222. The pre-shared password 222 can be agreed upon at the moment (e.g. use of the drivers license number), based upon a prior known value (e.g. property confirmation number) or other information. The local portal 14 then generates the mobile key data 200 therefrom. This generation can, for example, be performed with a local database of encryption keys and associated access control 16 information for the property to create the credential data 220. These encryption keys may be of a symmetric form, where each of the local portal 14 and access control 16 have a copy of the same encryption key and a mobile credential data 220 is generated by the local portal 14 and can be verified by the access control 16 based upon knowing the same key. Alternatively, the encryption keys may be of an asymmetric form where, for example, the local portal 14 may hold a private key that is used to construct a mobile credential data 220 that may be verified by the access control 16 based upon knowing the corresponding public key. Further, as is well known to those skilled in the art, the credential data 220 may be composed of multiple credentials that may also include certificates that can create a chain of trust where the local portal 14 has a public/private key pair that is declared as trust-worthy by a certifying party who holds a certifying private key. If the access control 16 knows the certifying public key, it can verify a certificate declaring the local portal 14 public key as trustworthy. Verifying a certificate is done by using the encryption key to verify the digital signature of the certificate where the signature would only be verifiable if the contents of the certificate have not changed. Then, after verifying the local portal 14 public key is trustworthy, the access control can additionally verify that the credential data 220 is valid by using the local portal 14 public key. The aforementioned example outlines how one certifier could vouch for the local portal, but those skilled in the art a chain or hierarchy of certifiers can be created where one certifier vouches for another until finally the last has vouched for the local portal. As long as the access control 16 has the root public key, the whole chain of certificates can be traversed and verified. Alternatively, instead of generating the credential data 200 locally, the local portal 14 can access another service, for example hosted in the cloud or on a secure network, to request to generate the mobile credential data 220. The credential data 220 is then encrypted with the pre-shared password 222 resulting in the mobile key data 200, which can then be made available for the guest and their appropriately designated access control 16. The credential data 220 can include, for example, data such as:

a. Credential data for authorizing guest to open the associated guest room access control, including but not limited to the same data that would be encoded onto a physical plastic magnetic strip or RFID card.

b. Credential data for other access points such as required for wi-fi network access, other access control systems (for example, a badge id), or authentication information for use with credential module 36 which is required for credential module 36 to validate, decrypt and retrieve credential data to open the associated guest room access control.

c. Logos, pictures, URLs, or other data that can be utilized to 'reskin' or customize the visual look of the mobile application 215 as displayed on the mobile device 12 such as for a particular property. This 'reskin' may happen after the mobile key data 200 has been received by the mobile app 215 and the data has been decrypted with password 222, or it may happen on receiving mobile key data 200 if parts of the 'reskin' data is included with mobile key data 200 but is not encrypted with password 222. Further, the 'reskin' may happen when the mobile key data 200 is loaded in combination with determining the current location of the mobile device 12 (for example, GPS coordinates) a determination that the mobile device must be at a property (e.g. Hotel) that is at that location and the 'reskin' data is retrieved separately from a public location (for example a Hotel website).

d. Remote programming data for an access control 16 such as the guest door lock to change a programmable parameter (for example to change encryption keys, to update a time table, to correct a real time clock, or any other typical access control parameter). This remote programming data may be sent to the access control 16 by the application 215 without knowledge of the guest and may be part of a lock management system method of using a 'sneaker net.' e. Credential data for authenticating other services (e.g. a thermostat 230 in the guest room).

Next, the mobile key data 200 is shared (step 106). That is, the mobile key data 200 is sent to the mobile device 12 from the local portal 14 directly, without routing through a cloud hosted credential service. Additionally, a guest can share their mobile key data 200 along with their pre-shared password 222, such that the credential 220 can be additionally transferred to another mobile device 12. The guest can send the same mobile key data 200 and password 222 as provided by the local portal 14, or they can use the app 215 to re-encrypt credential data 220 into a separate mobile key data 200 and with a different password 222. The mobile key data 200 can be shared from one mobile device 12 to another mobile device 12 using the same methods that the local portal 14 uses for local distribution. For example, a guest can email the data 200 to a friend. Or they could send it via SMS. Or their phone could present a picture or image 219 that their friend's mobile device 12 could view/receive with use of a camera on the friend's device. This provides an efficient way of distributing the credential data 220 locally to a friend without requiring account management or other cloud services.

In detail, there are several methods to share the mobile key 200:

a. Bluetooth: In this embodiment, the local portal 14 is utilized to send the mobile key 200 to the application 215 directly on the mobile device 12 via Bluetooth. In the application 215, the guest can select a feature such as 'get my key' and/or the property staff would select a feature on the local portal 14 to 'send key.' Once activated, the local portal 14 and mobile device 12 would discover each other, establish a Bluetooth connection, and transfer mobile key 200 from the local portal 14 to the application 215 on the mobile device 12.

b. Email: In this embodiment, the local portal 14 is utilized to send the mobile key 200 to an email address as a file attachment. Once received, the file attachment could then be copy/pasted into the application 215. This can also be performed by associating a particular file type with the associated application 215 so that when the file is 'opened' from the email client on the mobile device 12, the application 215 is launched. Alternatively, the mobile key 200 could be sent as a pre-formatted link in the email. The guest clicking on the link would activate the link and encoded in the link is contained the mobile key 200 and the mobile device would identify and launch the application 215 utilizing information encoded in the link identifying the application 215.

c. SMS: In this embodiment, the local portal 14 is utilized to send the mobile key 200 as a text message to the mobile device 12 as per the email embodiment.

d. Image: In this embodiment, the mobile app 215 can utilize a camera or scanner on the mobile device 12 to scan an image 219 presented on a display that is part of or associated with local portal 14 such as a kiosk 218 adjacent to the front desk 210. Scanning the image 219 allows the mobile device 12 to receive the mobile key 200 after the app 215 processes the image to retrieve the data.

e. NFC: In this embodiment, the mobile app 215 utilizes Near Field Communication (NFC) capability of the mobile device 12 to transfer the mobile key 200 from the local portal 14. NFC can operate in several modes and this embodiment could be used with any of the 3 modes. The mobile device 12 and local portal 14 could transfer the mobile key 200 in peer-to-peer mode. Or, they could transfer the mobile key 200 by the mobile device 12 reading a 'virtual card' from a reader device attached to the local portal 14 that emulates an ISO14443 data card that appears to mobile device 12 as a physical card. Or, the local portal 14 could operate in 'reader/writer' mode and write an ISO14443 card image to the mobile device with is emulating an ISO14443 data card. In all cases, the data is transferred using NFC from the local portal 14 to the mobile device 12 and mobile app 215.

This local compunction may, by including sending data from the application 215 back to the local portal 14, provide for the communication of guest preferences or control data to the front desk 210. This enhances the guest experience, for example, to communicate their preference for soft pillows, no wake up calls, etc. That is, the application 215 on the mobile device 12 may include preference selections that are communicated through the local portal 14 back to the front desk 210. This sending of such preferences data may be part of a response back to the local portal 14 confirming receipt of mobile key data 200. Or, this preferences data may be sent any time upon request of front desk 210 and by the guest activating a feature in the mobile app 215 to effect the process of sending preferences data back to the front desk.

Once the mobile key 200 is received in the application 215, the guest then enters the pre-shared password 222 to decrypt, the mobile key 200 (step 108). This decrypts the credential data 220 and stores into the application 215 so that the credential data can be used to operate the appropriate access control 16.

Finally, the credential data 220 is utilized by the mobile device 12 to provide access to the associated access controls 16 (step 110). The credential data 220 is then resident on the mobile device 12 and the user can then operate the appropriate access control 16 in an offline mode at any later time.

Figure 4:
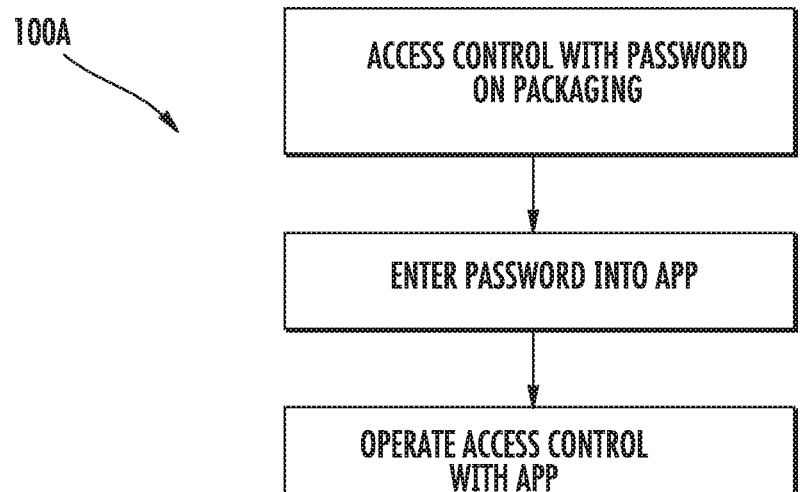
FIG. 4 is a flowchart for local communication of a credential method according to another embodiment.

With reference to FIG. 4, in another embodiment of the method 100A, residential home access is affected by opening a residential door lock 16 with a home owner's mobile device 12. The method of delivering the key to the phone is associated with the original purchase and installation of the access control 16. That is, the pre-shared password 222 in this embodiment may be associated with the printed packaging of the access control, provided on a sales receipt, and/or otherwise communicated to the homeowner. The residential door lock 16 could itself then send (e.g., over Bluetooth) a mobile key 200 that is encrypted with this pre-shared password. The homeowner can then enter the pre-shared password 222 into the app 215 and activate the mobile key 200. The sending of the mobile key 200 may be done only in a manner that the homeowner can activate, for example by pushing a button on the 'secure' side of the lock when it is unmounted from a door and in a sense this causes the door lock 16 to operate momentarily as a local portal 14 and send the mobile key 200.

Figure 5:
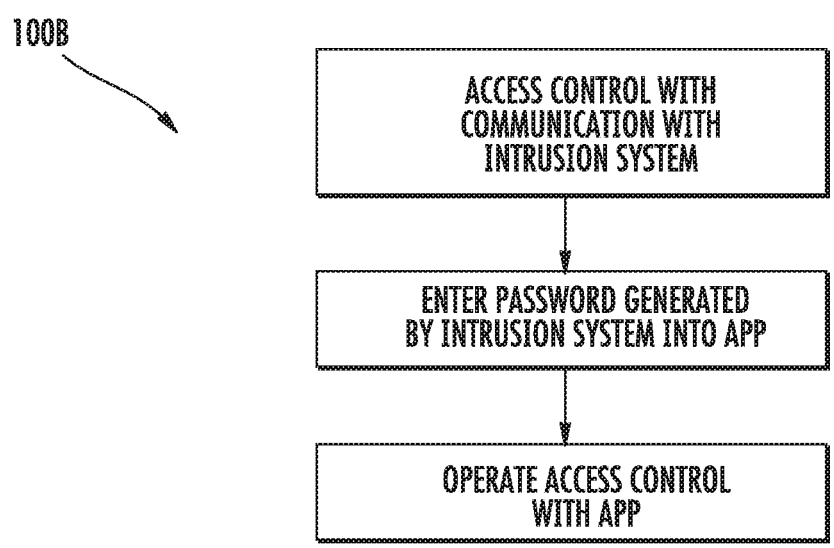
FIG. 5 is a flowchart for local communication of a credential method according to another embodiment.

With reference to FIG. 5, in another embodiment of the method 100B, the access control 16 can be paired with an intrusion system, which is the sender of the mobile key. In this case, the intrusion system acts as local portal 14. The pre-shared password 222 is then entered into or retrieved from the intrusion system. Alternatively, the pre-shared password 222 is displayed on the intrusion panel display and entered into the application 215.

With reference to FIG. 5, in another embodiment of the method 100C, the guest is issued a mobile key card at the front desk that is associated with a pre-shared password for a use with a particular access control 16. The pre-shared password would be entered when the mobile key card is encoded with a mobile key 200. After inserting the mobile key card into the access control 16, the mobile key 200 is loaded from the card and then sent (for example, by Bluetooth) from the access control 16 into the application 215 on the mobile device 12 of the guest. The pre-shared password that was encoded on the mobile key card is then entered into the application 215 to decrypt the credential 220. Alternatively, if the mobile device 12 supports the capability, the mobile key card can be read directly by the mobile device 12 to retrieve the mobile key data 200, for example if the mobile device 12 supports reading an RFID card using NFC.

The local credential distribution does not require a centralized service to be used by the mobile device 12 without requiring complex account management or cloud services. The mobile key 200 is secured by the pre-shared password 222 and the user does not need to manage yet another account and associated password. The property also does not need a cloud service or be required to pay a subscription fee to provide more streamlined operations. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Figure 6:
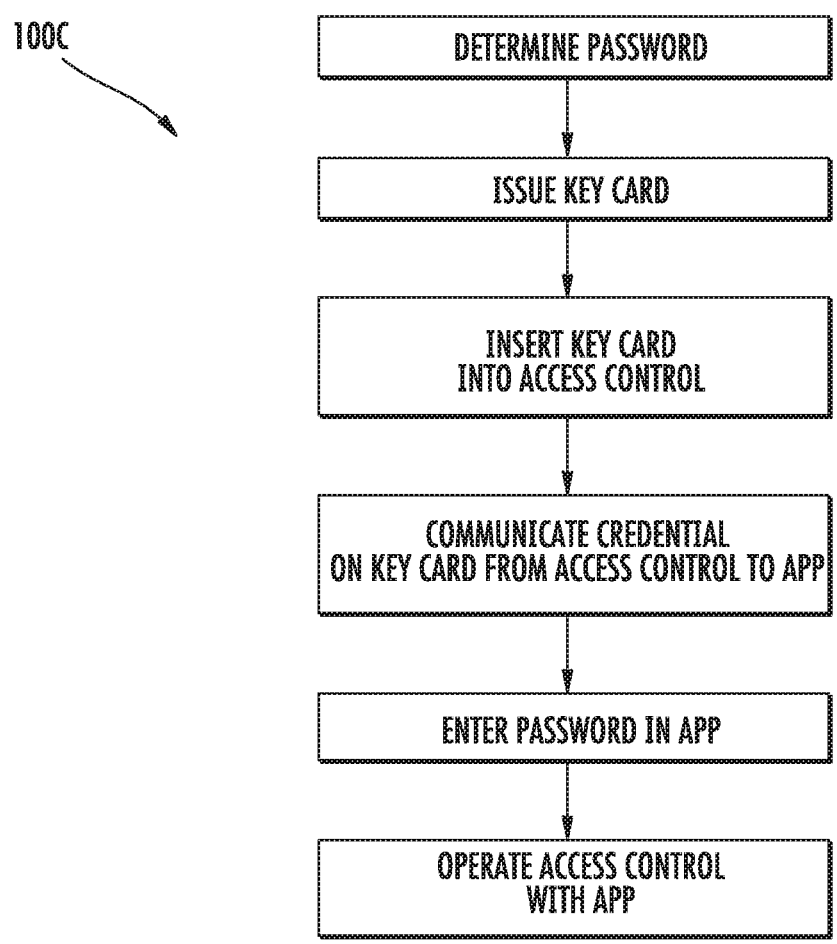
FIG. 6 is a flowchart for local communication of a credential method according to another embodiment.

With reference to FIG. 6, in another embodiment of the method 100C, the guest is issued a mobile key card at the front desk that is associated with a pre-shared password for a use with a particular access control 16. The pre-shared password would be entered when the mobile key card is encoded with a mobile key 200. After inserting the mobile key card into the access control 16, the mobile key 200 is loaded from the card and then sent (for example, by Bluetooth) from the access control 16 into the application 215 on the mobile device 12 of the guest. The pre-shared password that was encoded on the mobile key card is then entered into the application 215 to decrypt the credential 220. Alternatively, if the mobile device 12 supports the capability, the mobile key card can be read directly by the mobile device 12 to retrieve the mobile key data 200, for example if the mobile device 12 supports reading an RFID card using NFC.

The local credential distribution does not require a centralized service to be used by the mobile device 12 without requiring complex account management or cloud services. The mobile key 200 is secured by the pre-shared password 222 and the user does not need to manage yet another account and associated password. The property also does not need a cloud service or be required to pay a subscription fee to provide more streamlined operations. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Figure 7:
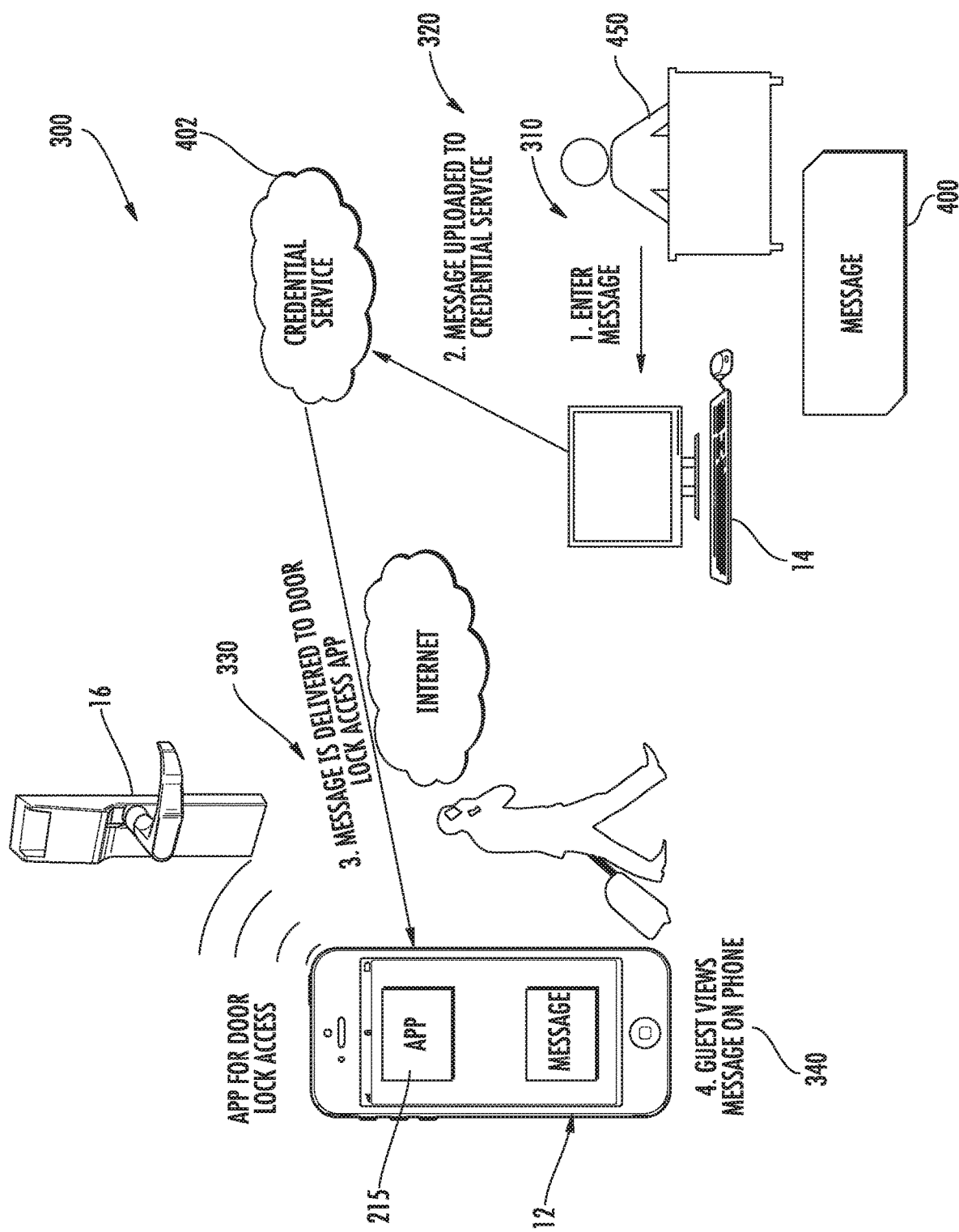
FIG. 7 is a flowchart of a messaging method performed by the user authentication system according to one embodiment.

With reference to FIG. 7, a method 300 is disclosed in terms of functional block diagrams. The method 300 provides for messaging with a guest associated with a property such as a hotel, gym, or other establishment which has a plurality of access controls 16 via communication with the access control application 215 through the same network as the credential 220 (FIG. 3). While a credential 220 (encrypted in a mobile key 200) may be communicated from a local portal 14 directly to an application 215 on a mobile device 12, alternatively, the credential 220 may be generated in a credential service 402 and downloaded to the mobile device 12. In either case, the method 300 provides for a message 400 to be sent along with a credential 220 to a mobile application 215.

Initially, property staff 450 can enter a message 400 into the local portal 14 (step 310). The message 400 is then uploaded to the credential service 402 (step 320) to be downloaded with a credential 220 (step 330) or the message 400 may alternatively be sent in essentially the same manner as the credential 220 is communicated as in method 100 above (step 106) as part of the mobile key 200 or in addition to the mobile key 200. The credential service 402 then communicates the message 400 to the application 215 on the mobile device 12 of the guest via the Internet, Bluetooth, etc., (step 330). The guest can then readily review the message 400 on the mobile device 12 (step 340). The guest may also communicate to the property staff via the application in the same manner to, for example, make specific requests, etc. or in response to a particular message 400.

The message 400 may, for example, be communicated to a specific guest or group of guests. The message 400 may be a plurality of messages. The message 400 may also be sent and displayed immediately or sent but not displayed until at scheduled times to, for example, alert the guests to a check-in time, check-out time, happy hour, or other such event. Message 400 may be specific to a particular guest and may be uniquely delivered to an application 215 associated with a particular guest. Further, the message 400 may not be specific and may be utilized to indicate an emergency such as fire, riot, or other such safety related event and in this case the message 400 is sent immediately and displayed to a multiplicity of guests. Displaying messages and handling notifications for messages is well known in the art of mobile applications 215. For example, the emergency broadcast type of message may be presumptively displayed on top of and over any other content shown on the mobile device 12 until the message is dismissed. Alternatively, for non-critical message 400 the message may be displayed only upon a guest desiring to view messages, for example in an 'in box' in the application 215.

With reference to FIG. 8, in another embodiment, the message 400 may have a location based component, such that when any, or a particular, guest identified by the access control application 215 passes a particular access control 16, so that the guest receives a particular message 400. The access control application 215 may detect it is near a location of an access control 16 and may request from the credential service 402 any message 400 associated with access control 16 and for this guest. Alternatively the message 400 may be sent but not displayed until at a particular location and the message is marked with information to indicate to application 215 as to when or where the message 400 should be displayed. For example, as the guest passes the pool area of the property, the guest will view a message with pool hours or a safety reminder regarding pool access. The capability for an application 215 to determine a proximal location to access control 16 may be done by any locationing method including determining proximity by receiving a Bluetooth advertisement from a device associated with access control 16, or from the access control 16 itself, or by utilizing other indoor location technology to determine relative location to an access control 16 based upon Wi-Fi location, indoor GPS, GPS, or other like technologies.

Further to being in proximity to an access control 16, the access control application 215 may not display a message 400 until a particular event happens at access control 16. For example, sending a credential to access control 16 and opening access control 16 may cause application 215 to display message 400. An example would be a personalized welcome message for a guest who has entered their guest room for the first time. This message may be displayed once or every time the access control 16 is accessed. Further, a message may have some delay after an event. An example would be a question to a guest to rate the hotel office amenities after they have accessed the access control 16 to enter the office and use the computer and printer. This message 400 would be displayed, for example, 5 minutes after entering the office. Or, the message 400 may not be displayed until they have left the office, which could be determined by the mobile device no longer being within proximity to the particular access control 16 after opening the access control 16.

Also, further to being in proximity to an access control 16, the message 400 may only be displayed after remaining in proximity for a certain amount of time without an associated access control event. For example, if someone briefly passes the pool door where there is an access control 16, but doesn't linger or open the door, the message 400 is not displayed. But, if, for example, they linger within proximity for longer than 30 seconds without opening the door, then a message 400 with the pool hours are displayed. Also, the message may be displayed after lingering for some amount of time within proximity to an access control 16 but only displaying the message after leaving the area and no longer being within proximity. For example, someone who lingered near the pool but did not open the access control 16 and then left the area could receive a message 400 asking if they forgot something or needed help.

Further, the above embodiments can be combined together, so that a message 400 may be displayed based upon proximity and upon a time of day. For example, someone approaching and lingering near the pool may only receive a message 400 indicating the pool hours if they are arriving outside of the normal pool hours.

Further, a message 400 may be displayed when in proximity to an access control 16 and based on the status of the access control. For example, property staff can receive particular messages 400 from the guest before they enter a particular room such as "do not disturb," or "please provide extra pillows". A "do not disturb" message may be displayed, for example, on a staff 450 mobile device 12 when they are proximal to a guest room door with a lock 16 that has a privacy bolt that is closed and the lock 16 is sending a Bluetooth advertisement indicating the status of the lock 16. Further, a guest may enter a message 400 request services such as "extra pillows" that is sent to credential service 402 and then sent to a property staff 450 who is utilizing local portal 14 to view messages 400 from guests. Alternatively the message 400 could be routed from a guest to a mobile device 12 that is associated with a property staff 450, for example who is assigned to clean the guest room associated with the guest. The property staff could also receive messages from other property staff 450 such as to immediately clean a particular room once the property staff alights onto that floor. Further, this message may be shown at a timeframe when the staff 450 is planning their cleaning activities. Alternatively, this message 400 from the guest or another message 400 from other property staff may be shown when the staff 450 is near a particular room and access control 16 so that the message is displayed at such a location that they can immediately respond to and perform the requested service.

The system and method provides the property with effective interaction with a guest via their access control system. The property messaging to and from a guest's mobile phone allows for a more personal touch point from the property to the guest without having to build their own property loyalty application.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

The invention claimed is:

1. A method of messaging, comprising:
communicating an informational message to a mobile application on a mobile device from an access control credential system for a multiple of electronic locks through the same network as a credential from the access control credential system, the informational message downloaded along with the credential to the mobile application; and
displaying the informational message from the access control credential system on the mobile device in response to an event and a proximity between the mobile device and one of the multiple of electronic locks, the informational message being specific to that one of the multiple of electronic locks, wherein the informational message is communicated to the mobile application at the same time as the credential, but is not displayed until the event and the proximity between the mobile device and one of the multiple of electronic locks is detected, wherein the event is a safety related event, and wherein the informational message is an emergency informational message.

2. The method as recited in claim 1, further comprising displaying the informational message on the mobile device in response to a time.

3. The method as recited in claim 1, further comprising communicating the informational message as a check-in reminder.

4. The method as recited in claim 1, further comprising communicating the informational message as a check-out reminder.

5. The method as recited in claim 1, further comprising communicating the informational message as emergency instructions.

6. The method as recited in claim 1, further comprising communicating the informational message in response to an event and the proximity between the mobile device and the electronic lock.

7. The method as recited in claim 1, wherein the proximity includes leaving a designated area.

8. The method as recited in claim 1, wherein the proximity includes passage through a doorway.

9. The method as recited in claim 8, wherein the doorway includes a door with the electronic lock.

10. The method as recited in claim 1, further comprising communicating a message from the mobile device back to a local portal of the access control credential system.

11. The method as recited in claim 1, further comprising entering the informational message to the local portal.

12. The method as recited in claim 11, wherein the local portal is a mobile device used by a hotel staff.

13. An access control credential system, comprising:
a local portal that comprises an access control credential system for a multiple of electronic locks, the local portal operable to receive an informational message;
a mobile application on a mobile device operable to receive the informational message from the local portal, wherein the mobile application on the mobile device is operable to communicate with the local portal via the access control credential system through the same network as a credential from the access control credential system, the informational message downloaded along with the credential to the mobile application; and
an access control, wherein the informational message is displayed on the mobile application in response to an event and a proximity of the mobile device to one of the multiple of electronic locks, the informational message being specific to that one of the multiple of electronic locks, wherein the informational message is communicated to the mobile application at the same time as the credential, but is not displayed until the event and the proximity between the mobile device and one of the multiple of electronic locks is detected, wherein the event is a safety related event, and wherein the informational message is an emergency informational message.

14. The system as recited in claim 13, wherein the application on the mobile device is operable to communicate with the local portal via at least one of Bluetooth, and Internet.

15. The system as recited in claim 13, wherein the local portal is a front desk portal.

16. The system as recited in claim 13, wherein the local portal is tailored for use by a hotel staff.

17. The method as recited in claim 16, further comprising communicating a guest message from the mobile device via the mobile application to the hotel staff in response to the informational message.

18. The method as recited in claim 1, wherein the mobile device is operable to communicate with the local portal in response to the informational message.

19. The method as recited in claim 1, further comprising displaying the informational message after a predetermined amount of time.

20. The method as recited in claim 1, further comprising displaying the informational message in response to an access control event associated with the one of the multiple of electronic locks.

21. The method as recited in claim 6, wherein the event is use of the credential to access the one of the multiple of electronic locks.

* * * * *